United States Patent Office 3,743,721
Patented July 3, 1973

3,743,721
METHOD FOR REDUCING TARTAR ACCUMULATION ON TEETH
Robert S. Mattox, 511 Pierce Ave., Macon, Ga.
No Drawing. Filed Sept. 17, 1971, Ser. No. 181,612
Int. Cl. A61k 15/12
U.S. Cl. 424—95
5 Claims

ABSTRACT OF THE DISCLOSURE

An ingestible composition for reducing tartar accumulations on teeth. The composition consists essentially of, as the active ingredients, from about 10 to 30 percent of ascorbic acid and from about 70 to about 90 percent of bone meal based on the weight of these active ingredients. A carrier may be included. One preferred form of the composition comprises about 17 percent of ascorbic acid and about 83 percent of bone meal. The ingested total daily dosage of the composition ranges from about 2,000 to about 4,000 milligrams while one of the preferred total daily dosages of the composition is about 2,900 milligrams. For example, a tablet or capsule of the composition comprising about 165 milligrams of ascorbic acid and about 800 milligrams of bone meal taken three times daily would, in general, significantly reduce tartar accumulations on the teeth.

BACKGROUND OF THE INVENTION

This invention relates generally to an ingestible composition for reducing the accumulation of tartar on the teeth and for preventing the breakdown of the boney support for the teeth. More particularly, this invention relates to a composition consisting essentially of, as the active ingredients, from about 10 to about 30 percent of ascorbic acid and from about 70 to about 90 percent bone meal based upon the weight of these active ingredients.

Periodontal disease is probably the greatest single cause of persons over age thirty-five losing their teeth. Periodontal disease is disease of the gums and other supporting structures of the teeth. One factor which causes periodontal disease is calculus or tartar, a hard, crustlike material that is deposited on the surface of the teeth. Calculus or tartar is composed mainly of minerals from the saliva and bacteria as well as other substances commonly found in a person's mouth. Tartar accumulations on teeth irritate the surrounding gums and gradually cause them to become swollen or inflamed and to separate from the teeth. In the early stages, tartar accumulations on the teeth and swollen gums detract from a person's overall appearance. If this condition remains untreated for a significant period of time, it can result in a loosening of the teeth and eventually loss of the teeth. Since a person's teeth and their supporting structures exert considerable influence in his day-to-day life by affecting his health, appearance and emotional well-being reducing the amount of calculus or tartar which accumulates on the teeth would provide considerable advantages for a significant portion of the general population.

While it is true that good dental hygiene practices are sufficient to retard tartar accumulations on the teeth, toothbrushing cannot completely prevent the accumulations. Thus, toothpastes and other dentifrice preparations provided for cleaning the exterior surface of teeth have generally proved unsatisfactory. For example, U.S. Pat. No. 2,470,906, issued May 24, 1949, for a "Dentifrice," discloses a dentifrice for transforming the mucinous coat on the teeth to facilitate easy removal of the coat by mechanical action. Further, known dentifrices which can be ingested have also proved generally unsatisfactory. For example, U.S. Pat. No. 2,154,168, issued Apr. 11, 1939, for "Dentifrice," discloses an impacting composition which it is stated reduces dental caries by effective neutralization of tooth destroying acids and by proper fortification of the diet, particularly with calcium and phosphate. The acids are neutralized by the calcium and phosphates which are retained adjacent the teeth by a medium which favors impaction thereto, particularly impaction in areas susceptible to caries.

It is an object of this invention to provide an ingestible composition for reducing tartar accumulations on the teeth which functions to produce this result through ingestion into the digestive tract.

Another object of this invention is to provide such an ingestible composition for preventing disease of the gums and other supporting structures of the teeth by reducing tartar accumulations.

A further object of the invention is to provide such an ingestible composition comprising, as the active ingredients, ascorbic acid, calcium and phosphorus.

A still further object of the invention is to provide such an ingestible composition in the form of tablet or capsule.

Other objects and advantages of the invention will be apparent from the following description.

DESCRIPTION OF THE INVENTION

I have found that a total daily dosage of from about 2,000 to about 4,000 milligrams of an ingestible composition comprising ascorbic acid and bone meal, as the active ingredients, is particularly effective in reducing tartar accumulations on teeth thus preventing swollen gums and a breakdown of the boney support for the teeth. The composition of the present invention consists essentially of from about 10 to 30 percent of ascorbic acid and from about 70 to about 90 percent of bone meal. Accordingly, the total daily dosage of the composition for obtaining these desired results is from about 200 milligrams to about 1,200 milligrams of ascorbic acid and from about 1,400 to about 3,600 milligrams of bone meal. It is to be understood that the term "percent," as used herein, refers to percent by weight of the active ingredients.

More particularly, a total daily dosage of about 2,900 milligrams of the ingestible composition of the present invention consisting essentially of about 17 percent of ascorbic acid and about 83 percent of bone meal as the active ingredients therein produces particularly desirable results.

The composition described above can be prepared for ingestion by forming the composition into a tablet, capsule, or powder. A tablet or capsule could contain a total daily dosage of the composition; however, it is preferable that a tablet or capsule contain a portion of the total daily dosage and that such capsules be ingested periodically throughout a 24-hour period to bring the daily consumption of the composition up to the desired total daily dosage of the active ingredients. For example, a tablet containing about one-third the total daily dosage of the composition would have from about 65 milligrams to about 400 milligrams of ascorbic acid and from about 465 milligrams to about 1200 milligrams of bone meal.

The processes for forming the composition of the present invention into a tablet, capsule or powder are well known in the art. It should be noted, however, that where the active ingredients of ascorbic acid and bone meal do not contribute sufficient volume to bring a tablet or capsule up to the desired size, or where a single dosage of a powder would not be of appropriate volume, a pharmaceutical carrier, such as starch, can be added to increase the volume of the composition. Further, if a particular color of the composition is desired, it can be obtained by introducing a dye certified by the U.S. Food and Drug Administration. Finally, tablets of the composition can be coated to enhance the flavor experienced upon ingestion thereof.

The significant reduction in the amount of tartar accumulating on teeth produced by the composition of the present invention is illustrated by the following example.

EXAMPLE

To demonstrate the significant results produced by the ingestion of my composition, a study was conducted utilizing about 300 patients. The example below sets forth the result from 149 patients. The first 100 patients were used to establish techniques and methods for the remainder of the study. Of the remaining 200, 51 patients dropped out of the study because of scheduling problems et al. All of the patients were examined regularly at appointments spaced approximately six months apart. At the first appointment, a routine cleaning and prophylaxis of the patient's teeth was performed. Each of the patients examined had a relatively heavy tartar accumulation on his teeth, especially on the lingual surfaces of the lower anterior teeth. To assure uniformity in the study, the tartar accumulations on the teeth were not evaluated until the second appointment. Also, the patients were not instructed or encouraged to change their dental habits at any of the appointments.

At the second appointment, each of the patients was categorized by assigning one of the numbers 1, 2, 3 or 4 to the patient based on the amount of tartar accumulation on his teeth. The number 4 represented excessive tartar accumulation, while the number 1 represented very slight accumulation. The pH of the patient's saliva was also determined using litmus paper. A routine cleaning of the patient's teeth was again performed.

During the second appointment, each of 100 patients of the group of 151 patients remaining in the study was instructed to begin taking a total daily dosage of a composition having about 2,900 milligrams of the active ingredients comprising about 17 percent ascorbic acid and about 83 percent bone meal. Thus, these patients' total ingested daily oral dosage of ascorbic acid was about 500 milligrams and the total daily dosage of bone meal was about 2,400 milligrams in the form of 3 tablets each having about 967 milligrams of active ingredients. Another group of 26 patients was given only one-half of the above total daily dosage, or about 1,450 milligrams of the same composition. Still another group of 23 patients was not treated with the composition.

At the third appointment all of the patients were again evaluated to reclassify them based on the tartar accumulations on their teeth, and to determine the pH of their saliva. Of the 100 patients who took a daily dosage of 2,900 milligrams of the composition during the six-month period, 73 patients tended to show a marked decrease in the amount of tartar accumulated on their teeth when compared with the amount of tartar accumulated during the previous six-month period. Further, the saliva of 66 of the patients was found to have what would be considered to be a neutral pH. In general, each of these patients expressed a feeling that their mouth felt cleaner than it had previously.

A noticeable decrease in the tartar accumulations on the teeth of 16 of these 100 patients occurred, but the decrease was not as significant as in the case of the 73 patients above.

The remaining 11 patients of this group of 100 patients experienced little change in the level of tartar accumulation on their teeth. The experience of these 11 patients could, in part, be explained inasmuch as they generally appeared to have very poor brushing habits. The saliva of these patients also showed a neutral pH.

The tartar accumulations on the teeth of the 26 patients who were given only one-half of the total daily dosage did not decrease to any significant degree. Likewise, the group of 23 patients who did not take the composition experienced little change in the tartar accumulations on their teeth between second and third appointments. These 49 patients, as well as the 89 patients who experienced a decrease in the tartar accumulations on their teeth, had brushing habits which varied from excellent to very poor.

Bone meal, as used herein, is a meal produced by grinding animal bones which have been previously steamed under pressure. Bone meal comprises 2 to 3 percent ammonia and 50 to 55 percent tribasic calcium phosphate.

Although my composition has been described as comprising ascorbic acid and bone meal, it is to be understood that bone meal is included therein as a source of calcium, phosphorus and the other ingredient found in bone meal. Thus, the proportion of bone meal in the composition of the present invention is important in that it defines the proportions of the ingredients of calcium, phosphorus and the other ingredients of bone meal to ascorbic acid, the other active ingredient of the composition. Therefore, it is to be understood that other materials may be substituted in this composition for bone meal, provided the combination of materials contributes about the same weight percent of the bone meal ingredients.

The above description of the composition of the present invention is intended to illustrate the broader aspects of the invention, and other modifications and variations may be made without departing from the spirit and scope of the present invention.

What is claimed is:

1. A process for reducing tartar accumulations on teeth comprising the step of ingesting between about 2,000 milligrams and about 4,000 mililgrams of a composition consisting essentially of from about 10 to about 30 percent of ascorbic acid and from about 70 to about 90 percent of bone meal as the active ingredients, said composition being ingested on the basis of a daily dosage over a period of at least about six months.

2. A process in accordance with claim 1 in which about 2,900 milligrams of the composition are ingested for each daily dosage.

3. A process in accordance with claim 2 in which the ingested composition consists essentially of about 17 percent ascorbic acid and about 83 percent bone meal.

4. A process in accordance with claim 1 in which the composition is ingested in the form of tablets or capsules each having from about 65 milligrams to about 1,200 milligrams of ascorbic acid and from about 465 milligrams to about 3,600 milligrams of bone meal, each tablet having a combined weight of ascorbic acid and bone meal in the range of from about 650 milligrams to about 4,000 milligrams.

5. A process in accordance with claim 4 in which each tablet or capsule has about 165 milligrams of ascorbic acid and about 800 milligrams of bone meal.

References Cited

FOREIGN PATENTS 674,909    7/1952    Great Britain _____ 424—95

RICHARD L. HUFF, Primary Examiner

U.S. Cl. X.R.

424—280